Aug. 3, 1965 J. P. YODER 3,198,688
EMBOSSED LAMINATE AND METHOD OF MAKING SAME
Filed Aug. 18, 1961

INVENTOR:
JACK P. YODER
BY Howson & Howson
ATTYS.

United States Patent Office 3,198,688
Patented Aug. 3, 1965

3,198,688
EMBOSSED LAMINATE AND METHOD OF MAKING SAME
Jack P. Yoder, Newark, Del., assignor to The Budd Company, a corporation of Pennsylvania
Filed Aug. 18, 1961, Ser. No. 132,321
4 Claims. (Cl. 161—97)

This invention relates to molded plastic articles, and more particularly, to plastic laminates having suitable ornamental designs, diagrams, indicia and the like permanently embossed therein.

Plastic laminates are used extensively in the electrical industry for insulating and supporting component parts in electrical equipment. For example, plastic laminates find use as capacitor caps, terminal boards, labels, panels, spacers, coil ends, plug and socket bases, etc. Numbers, letters and other indicia, as well as diagrams, are applied to the laminates for identification and to aid in correct installation of component parts. It has been the practice to engrave such indicia and the like in the surface of the laminates and then fill the engraved areas with a pigment, generally a white pigment. Direct printing on plastic laminates, as well as the application thereto of decalcomanias also have been used for identifying parts, systems and connections. Unfortunately, marking of plastic laminates in these ways is not permanent. The pigments and inks are removed through wear or abrasion, and most printing and decalcomania markings are removed by solvents as well as by abrasion. Furthermore, printing and decalcomania markings are expensive and their application to plastic laminates requires the use of special equipment.

An object of the present invention to provide molded plastic articles having suitable ornamental designs, diagrams, indicia and the like, permanently embossed therein.

Another object of this invention is the provision of a relatively simple and inexpensive method of providing molded plastic bodies with permanently embossed numbers, letters, designs, diagrams, and the like.

A further object of this invention is to provide a molded plastic article having a light-transmitting surface which may be permanently embossed with letters, numbers and and other indicia during further fabricating steps to which the article may be subjected.

Other objects and advantages will become apparent from a consideration of the following detailed description and the accompanying drawings in which.

According to this invention there is provided an article bearing an ornamental design, diagram, indicia or the like comprising a colored body of infusible, insoluble thermosetting resin composition having a light-transmitting layer bonded to a surface thereof through which the body is visible, the light-transmitting layer comprising fibrous sheet material impregnated with infusible, insoluble thermosetting resin compatible with the thermosetting resin of the body, selected portions of the light-transmitting layer being disrupted creating light-reflecting portions forming such ornamental design, diagram, indicia or the like on the article, the color of the body contrasting with the color of the light-reflecting portions of the light-transmitting layer.

It was discovered that when a colored body of thermosetting resinous composition is provided with a light-transmitting surface layer comprising thin fibrous sheet material impregnated with a light-transmitting thermosetting resin through which the colored body is visible, and the light-transmitting surface layer is disrupted in selected areas, the disrupted areas become light-reflecting, and are generally white in color. The colored body which is visible through the light-transmitting surface layer may be provided with any desired contrasting color, such as brown, blue, green, etc. The colored body need merely reflect sufficient light to be visible through the light-transmitting layer and thus may be semi-transparent, translucent or opaque. An examination of the light-reflecting areas under a microscope reveals that they are formed of exposed, essentially randomly oriented fibers of the thin fibrous sheet material which have been disrupted by a punch or other sharp instrument. To some degree these fibers have attached thereto resin particles separated from the mass of cured light-transmitting resin, which resin particles appear to have light-reflecting properties. By properly combining clear light-transmitting areas with disrupted light-reflecting areas, innumerable effects may be obtained from ordinary printing to ornamental designs. A particular advantage of this invention is that the articles are permanently embossed with printing, a design or the like, whereas heretofore where pigments have been used, such markings were temporary being easily eradicated by wear, abrasion, solvent action and the like.

Figure 1:
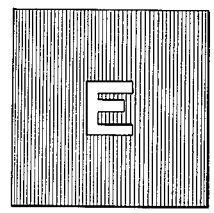
FIGURE 1 is a plan view of a laminate according to the invention having the letter "E" punched in the surface thereof.
Figure 2:
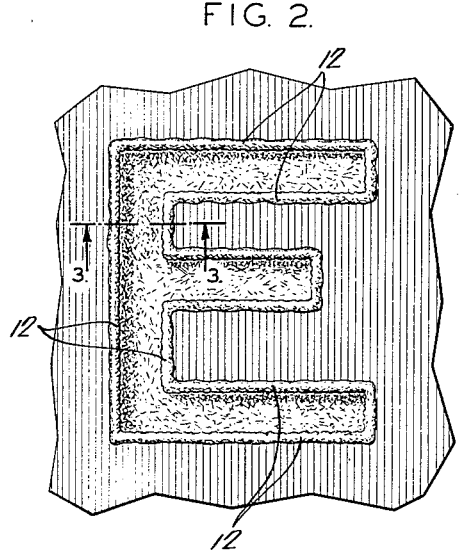
FIGURE 2 is an enlarged plan view of that portion of the laminate of FIGURE 1 bearing the letter "E"

Referring to the drawings, wherein the same numbers are used to indicate like elements, the laminate of FIG. 1 bearing the letter "E" punched in the upper face thereof comprises a body 10 of superimposed thermosetting resin-impregnated layers of fibrous sheet material, bonded together under heat and pressure. The body is of any color, other than white, and may be semi-transparent, translucent or opaque. Bonded to the surface of body 10 is light-transmitting layer 11 through which the color of the body is clearly visible. Layer 11 comprises fibrous sheet material, such as alpha cellulose, impregnated with a thermosetting resin, such as a phenol formaldehyde resin, which is compatible with the resin of the body.

Figure 4:
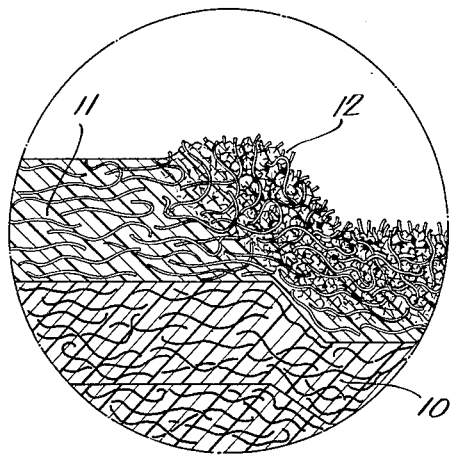
FIGURE 4 is that portion of FIGURE 3 indicated by the circle 4, greatly magnified.
Figure 3:
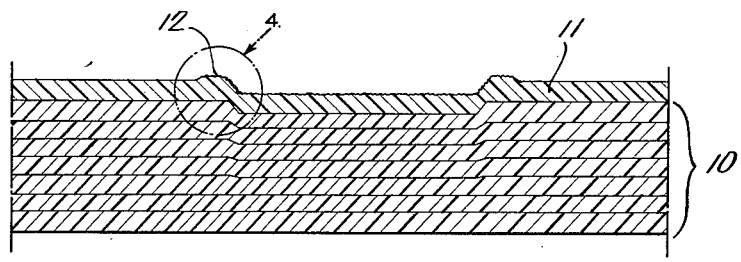
FIGURE 3 is a greatly enlarged section on the line 3—3 of FIGURE 2.

The letter "E" has been punched in the light-transmitting layer by an ordinary punch. It can be seen that the punch not only indents the transparent surface layer, but also causes some of the fibrous material and resin of this layer to be displaced to form ridges 12 along the edges of the letter. The punch also has disrupted the fibers of the sheet material in the light-transmitting layer and broken up the resin into particles. This can be seen best in FIG. 4. These fibers and resin particles reflect light and have a generally white color which contrasts with the color of the body 10 which can be seen therethrough.

In practicing this invention, the light-transmitting surface layer of the molded article may be obtained by impregnating thin fibrous sheet material with a thermosetting resin which, in the final cured state, i.e. infusible, insoluble state, is light-transmitting. The fibrous sheet material which is impregnated with resin should possess sufficient transparency or translucency, either under natural conditions or, at least, after it has been impregnated and cured, to disclose with sufficient clearness the color of the body of the article. Very thin paper, such as kraft, alpha cellulose, rag or cotton linters paper having the above properties may be used, white alpha cellulose or white cotton linters being particularly preferred. Preferably, the paper is highly absorbent and has good wet strength. The fibrous sheet material may vary in thickness in the range between about 1.5 and about 12 thousandths of an inch, highly absorbent paper having a thickness of from about 2.5 to about 4 thousandths of an inch being particularly preferred.

The thin fibrous sheet material comprising the ultimate light-transmitting surface layer may be impregnated by thermosetting resin by use of a suitable resin varnish, as for example, a phenol formaldehyde resin solution. The fibrous sheet material preferably is first impregnated with a hydrophilic phenol formaldehyde or other thermosetting resin varnish in order to obtain a uniform coating on the fibers. This can be followed with impregnation with a less hydrophilic or a hydrophobic varnish to form additional protective resin coating. Only one coating of either type of varnish need be used, provided the fibers are thoroughly saturated. Any such varnish should have a low enough viscosity to permit saturation of the fibers.

After the thin fibrous sheet material has been impregnated or saturated with such a varnish, it should be dried in an oven to remove the liquid vehicle or solvent from the resin. Drying can be carried out at room temperature or at elevated temperatures up to about 150° C. Particularly satisfactory results may be obtained at a temperature of about 135° C. and a drying time of about 10 minutes, producing a sheet which is dry to the touch.

As stated above, the thermosetting resin with which the fibrous sheet material is impregnated should be light-transmitting, i.e., transparent or translucent, at least in the cured state so that the color of the body of the article is visible. Any of the various well known thermosetting resins which will produce an impregnated sheet which will transmit light, such as phenol formaldehyde, cresol formaldehyde, xylenol formaldehyde, melamine formaldehyde, urea formaldehyde, epoxy, polyester and the like resins, and mixtures thereof, may be used. A particularly preferred resin is a phenol formaldehyde resin.

The resin content of the thin fibrous sheet material forming the light-transmitting surface layer may be from about 20 to about 65 percent, by weight, of the sheet material. Below this amount, the sheet may be too poor in resin, whereas amounts considerably in excess thereof may interfere with obtaining embossed figures, designs, etc. of the desired high degree of clarity. Preferably the sheet material has a resin content of about 50–60 percent.

The body portion of articles produced according to this invention may be formed of a thermosetting resin composition. If the resin forming the body portion, in the cured state, i.e., the infusible, insoluble state, is light-transmitting, various colored pigments and/or fillers should be incorporated therein to provide sufficient light-reflection and color to contrast with the whitish, light-reflecting areas of the light-transmitting surface layer. The body portion may be formed of the same various well known thermosetting resins, such as phenolic, cresol formaldehyde, xylenol formaldehyde, melamine, urea, epoxy, and polyester resins as are used to impregnate the thin sheet comprising the surface layer.

The thermosetting resin with which the fibrous sheet material comprising the surface layer is impregnated should be compatible with the thermosetting resin of the body of the article so that there is obtained a high degree of bonding therebetween. Thus, if the body comprises phenol formaldehyde resin, the thin fibrous sheet material forming the surface layer ordinarily will be impregnated with phenol formaldehyde resin. Similarly, if melamine-formaldehyde resin is used in the body, the same resin ordinarily will be used to impregnate the sheet material comprising the light-transmitting layer.

The resin used in the light-transmitting layer as well as that used in the body of the article may be plasticized to improve fabricating properties. Typical plasticizers are oils such as china wood, oiticica and dehydroxylated castor oil, and high boiling solvents such as dibutylphthalate, glycerol, methyl phathalate and glycol esters and ethers. Internally reacted plasticizers may also be used. The plasticizer will ordinarily comprise about 2 to 40 percent of the resin varnish.

Chlorinated bi-phenyls, chlorinated paraffins, chlorinated and grominated phenols and their derivatives, phosphates, etc. may be added to the resins to form flame retardant products. Antimony trioxide may also be added to the resin of the body in amounts of 1 to 10 percent to produce fire retardant properties as well as pigmentation.

According to a preferred form of this invention, the body of the article will be in the form of a laminate comprising superimposed layers of fibrous sheet material impregnated with thermosetting resin. Ordinarily the resin varnish used to impregnate the sheet material of the body will be less hydrophobic than that used to impregnate the sheet material of the light-transmitting layer. The fibrous sheets or laminae that form the body of the article may comprise paper and woven and non-woven fabrics of organic fibers or mineral fibers. Usually such fibrous sheets will be thicker than the sheet material of the light-transmitting layer.

The body may be colored either by coloring the thermosetting resin, the fibrous sheet material or both. In coloring the resin, any dye or pigment which is stable in the varnish system and which will not decompose at laminating temperatures and pressures, such as under a pressure of the order of 1000 p.s.i and a temperature in the range of 250–350° F., may be used. Any dye should be stable to such solvents as water, alcohol, acetone, benzene, toluene, xylene, etc., which may be used as the liquid vehicle for the resin in the solvent system. It is desirable that the dye is soluble in the liquid vehicle. Any of the water soluble dyes having the above properties and which are well known in the industry for use in coloring paper may be used in the varnishes in the amount of from 0.5 to about 2 percent. Other coloring agents or pigments for coloring the varnish of the body include carbon black to produce a black color, brown oxide of iron to produce a reddish hue, selenium sulfide to produce a deep red color and cadmium sulfide to produce a yellow or orange color. There are many other suitable pigments and dyes not specifically mentioned herein, but well known to those skilled in the art.

The use of colored fibrous sheet material is a ready way of providing the body with color even if clear resins are used. Of course, the coloring agent for the fibrous sheet material, whether a dye or pigment, should be stable at laminating temperatures and pressures.

In manufacturing articles of a laminated structure, ordinarily the lamina of fibrous sheet material forming the body may be impregnated with a thermosetting resin varnish, dried, and the resin advanced to a non-tacky state, if desired, in the same manner as the thin sheet comprising the light-transmitting surface. Thereafter, a plurality of such resin-impregnated layers of fibrous sheet material are superimposed between pressing plates or in a die with the surface layer of resin-impregnated thin fibrous sheet material which provides the light-transmitting surface. The assembled sheets or laminae are then consolidated under heat and pressure to cure the resin. Laminating temperatures of about 260–350° F. and pressures of 200–1500 p.s.i. may be used with most types of resins. With phenolic resins temperatures of 300–310° F. and pressures of 950–1100 p.s.i have been found to be particularly satisfactory.

In the final product of the invention, the ultimate light-transmitting surface layer will be only slightly thicker than the original thickness of the fibrous sheet material (.0025–.004″).

Permanently embossed letters, numbers, diagrams, etc. may be formed in the light-transmitting surface layer merely by disrupting selected portions thereof by a sharp instrument. For example, letters and numbers may be punched in the light-transmitting surface with ordinary punches and tools used for such purposes in the plastics industry. These tools disrupt the surface to provide permanently etched indicia. Free hand designs and drawings may be made on the light-transmitting surface by means of a sharp tool.

Various articles can be made embodying this invention such as panels, terminal boards, plug and socket bases, etc. Advantageously, indicia may be placed on the articles during fabrication. For example, in punching plug and socket bases from sheet stock, the indicia can be applied during the punching operation.

In the specification and drawings particular embodiments of the invention are disclosed; however, it is to be understood that the invention is not limited to the details disclosed, but includes all such variations and modifications as fall within the spirit of the invention and the scope of the appended claims.

What is claimed is:

1. The method of producing a laminated article exhibiting an ornamental design, diagram, indicia, or the like, said method comprising the steps of, forming a colored partially cured resinous body, forming a partially cured surface layer for said body by applying to an absorbent paper having a substantially uniform thickness of 1.5 to about 12 thousandths of an inch, a thermosetting resinous material to provide a resinous layer having about 20 to 65%, by weight of thermosetting resin, uniformly penetrated into fibers of said paper, partially curing the impregnated paper by drying, integrally laminating said surface layer to a surface of said body by heat and pressure sufficient to cure said resinous material of said body and said surface layer thereby providing an article having a clear surface layer through which the color of said body is visible, disrupting said surface layer by mechanically fracturing the same throughout areas corresponding to given ornamental design, diagram, indicia, or the like to form diffusely reflecting discrete particles to said body and producing an embossing consisting of said discrete particles of said impreganting resinous material interconnected by discrete fibers of said sheet material, whereby the visual aspect of the diffusely reflecting particles contrasts with the visual aspect of the colored body as viewed through the remainder of the top layer to exhibit the given indicia.

2. The method according to claim 1 in which said paper has a thickness of from about 2.5 to about 4 thousandths of an inch and is impregnated with an amount of said resinous material providing said paper with a resin content of from about 50 to 60 percent, by weight of said paper.

3. The method of claim 1 wherein said article is blanked to its outline form from the integrally laminated body and surface layer and wherein the indicia forming disrupting step is performed simultaneously with said blanking step.

4. A laminate article bearing an ornamental design, diagram, indicia or the like constructed according to the method of claim 1, wherein said thickness of absorbent paper comprises a stratum of non-woven fibers, and said thermosetting resinous material impregnated in said paper upon completion of said curing step and after subjection to said disrupting step is fractured by the latter step to create a great multiplicity of minute resin particles within said selected portions, said fibers serving to string said minute particles together, said particles having an index of refraction approximating that of said paper fibers, said minute resin particles thereby providing a myriad of randomly oriented reflecting surfaces capable of diffusely reflecting light striking the same within the disrupted selected portions of said article.

References Cited by the Examiner

UNITED STATES PATENTS

| | | |
|---|---|---|
| 272,033 | 2/83 | Edge. |
| 392,794 | 11/88 | France. |
| 1,410,899 | 3/22 | Duncan. |
| 1,985,480 | 12/34 | Carpenter. |
| 2,243,736 | 5/41 | Loblein. |
| 2,646,380 | 7/53 | Barlow et al. _____ 156—224 |
| 2,760,899 | 8/56 | Cameron et al. _____ 156—224 |
| 2,801,198 | 7/57 | Morris et al. _____ 41—22 |

FOREIGN PATENTS 341,151  6/32  Great Britain.

EARL M. BERGERT, *Primary Examiner.*